Patented Aug. 18, 1925.

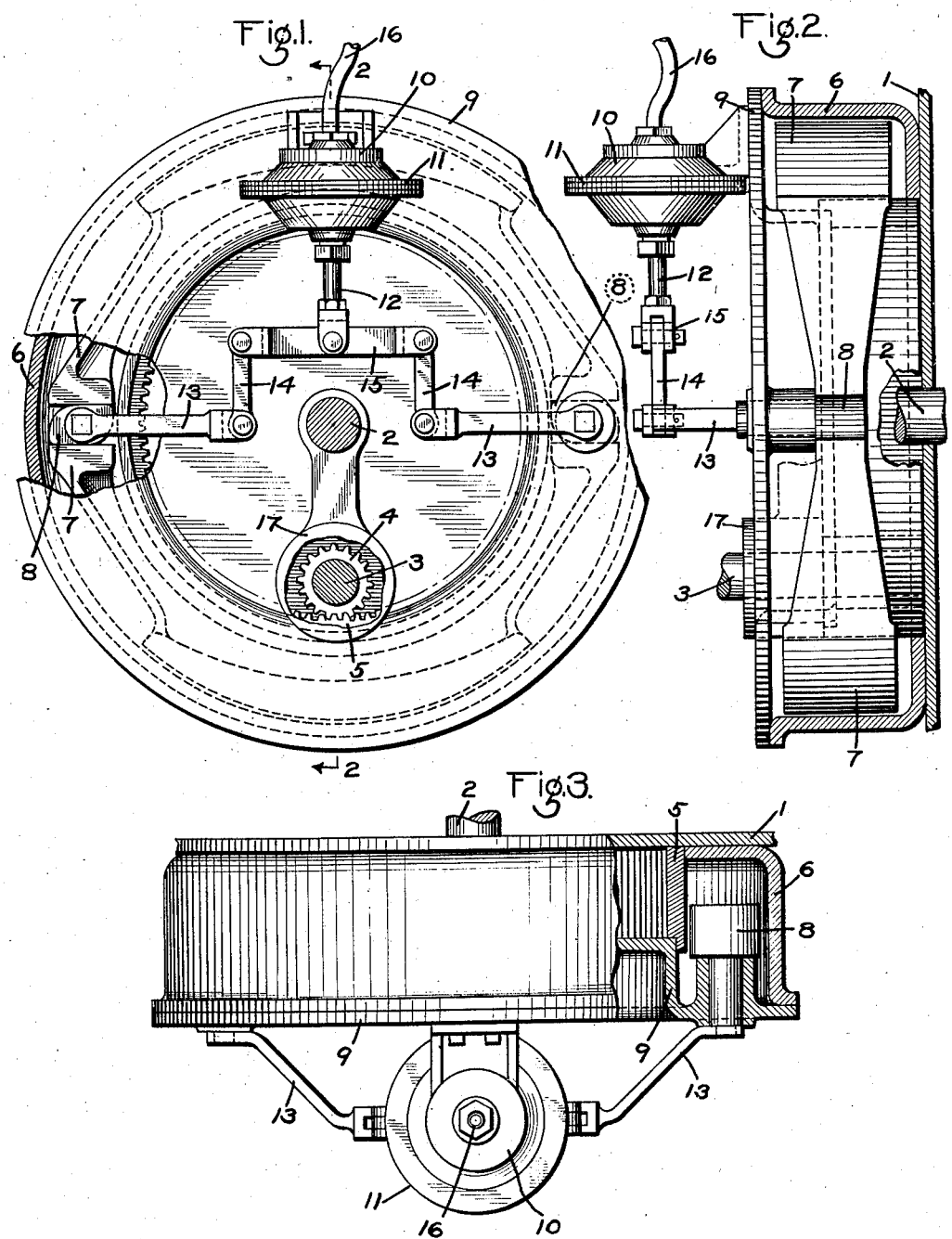

1,549,751

UNITED STATES PATENT OFFICE.

SIDNEY G. DOWN, OF PITTSBURGH, PENNSYLVANIA, ASSIGNOR TO THE WESTING-HOUSE AIR BRAKE COMPANY, OF WILMERDING, PENNSYLVANIA, A CORPORATION OF PENNSYLVANIA.

AUTOMOTIVE BRAKE.

Application filed April 26, 1923. Serial No. 634,760.

*To all whom it may concern:*

Be it known that I, SIDNEY G. DOWN, a citizen of the United States, residing at Pittsburgh, in the county of Allegheny and State of Pennsylvania, have invented new and useful Improvements in Automotive Brakes, of which the following is a specification.

This invention relates to fluid pressure brakes, and more particularly to a brake adapted for application to a motor vehicle.

It has been proposed to provide a rear axle construction for a motor vehicle in which a power axle is disposed below the wheel axle and is provided with pinions adapted to mesh with internal gears mounted on each of the rear wheels. The power axle is mounted in a housing and the housing and axle are free to swing so that the load and power are transferred automatically to the rim, and eccentrically to the wheel as conditions may require. Without entering into a further description of this mechanism, it is deemed sufficient for the purposes of my invention to point out that with the above construction there is a relative forward and rear movement of the vehicle body with respect to the rear wheels during the running of the vehicle under certain conditions as well as a relative vertical movement. The result so far as the brakes are concerned is that the usual brake mechanism cannot be employed, since there is, of course, no provision for the lengthening and shortening of the connecting brake rods to compensate for the relative movement of the vehicle body.

The principal object of my invention is to provide a fluid pressure brake for a motor vehicle equipped with a power axle construction of the above character and in which the above difficulty is overcome.

For accomplishing the above object I provide a brake construction which is associated with the rear wheels so that the brakes are independent of any movement of the vehicle body.

In the accompanying drawing; Fig. 1 is an inside face view of a rear wheel of a motor vehicle equipped with a power axle of the swinging type and showing my improved brake applied thereto; Fig. 2 a section on the line 2—2 of Fig. 1; and Fig. 3 a top plan view, partly broken away, of the construction shown in Fig. 1.

As shown in the drawing, each rear wheel, indicated in the drawing by the reference numeral 1, is carried by a wheel axle 2. Disposed below the wheel axle is a power axle 3 having a piston 4 at opposite ends, adapted to mesh with an internal gear 5 which is secured to the rear wheel 1.

Secured to the wheel 1 concentric with the internal gear 5 is a brake drum 6 having an internal friction face against which opposite brake shoes 7 are adapted to engage. Interposed between the adjacent ends of the brake shoes 7 at opposite sides are cams 8 adapted upon rotation to expand the brake shoes 7 so as to frictionally engage the brake drum 6.

The cover plate 9 for the gear 5 is extended so as to also serve as the cover plate for the brake drum 6 and on this cover plate is secured a diaphragm brake chamber 10 containing a flexible diaphragm 11 adapted to operate a diaphragm rod 12. Connected to each operating cam 8 is a lever 13 and said levers are connected by links 14 to the ends of an equalizing lever 15, which is connected at an intermediate point with the diaphragm rod 12.

Fluid under pressure is supplied to and released from the brake chamber 10 through a flexible hose connection 16.

The housing 17 of the pinion 4 extends through the cover plate 9 and oscillates with the power axle housing, so that the cover plate 9 also oscillates whenever the power shaft 3 oscillates.

When fluid under pressure is supplied through the flexible hose 16 to the brake chamber 10, the diaphragm 11 therein is operated and thereby the diaphragm rod 12 is pushed outwardly so that the levers 13 are shifted to partially rotate the cams 8. The brake shoes 7 are then expanded so as to frictionally engage the brake drum 6 and thus cause an application of the brakes.

It will now be seen that with the above described brake construction, since the brake mechanism is associated with the vehicle wheel, the braking action is not interfered with by relative movement of the vehicle body with respect to the wheel, as would be the case where the braking power is transmitted through brake rods of the usual character.

Having now described my invention, what I claim as new and desire to secure by Letters Patent, is:—

In a vehicle brake, the combination with a brake drum having a cover plate and brake shoes mounted in said drum, of a cam interposed between each opposite pair of adjacent ends of said brake shoes, an arm connected to each cam, an equalizing lever, a link connecting said lever to each arm, and a brake chamber carried by said cover plate and provided with a push rod operatively connected to said lever.

In testimony whereof I have hereunto set my hand.

SIDNEY G. DOWN.